United States Patent [19]

Woodward

[11] 3,855,532

[45] Dec. 17, 1974

[54] ELECTRICAL GAUGE INDICATOR RETURN DEVICE

[75] Inventor: Gary F. Woodward, Ann Arbor, Mich.

[73] Assignee: Ford Motor Company, Dearborn, Mich.

[22] Filed: Dec. 5, 1973

[21] Appl. No.: 422,112

[52] U.S. Cl. .............................................. 324/154
[51] Int. Cl. ........ G01r 1/00, G01r 5/16, G01r 5/26
[58] Field of Search ........... 324/154, 140, 154, 144, 324/104, 106

[56] References Cited
UNITED STATES PATENTS

| | | | |
|---|---|---|---|
| 2,382,315 | 8/1945 | Hiller | 324/140 |
| 2,515,375 | 7/1950 | Kelly | 324/144 |

*Primary Examiner*—Gerard R. Strecker
*Attorney, Agent, or Firm*—Robert W. Brown

[57] ABSTRACT

An indicator return device for an electrical gauge which produces a reading when electrical power is supplied to it, but which requires means for producing torque to return its indicator to a zero or reference position when the gauge is disconnected from a source of electrical power. The indicator return device comprises a bimetallic strip attached to the gauge frame and a leaf spring also attached to the frame. A cam is attached to the shaft on which the gauge indicator is mounted. A resistance wire is wound around a portion of the bimetallic strip. When electrical power is supplied to the gauge, a current flows through the resistance wire. This heats the bimetallic strip causing it to bend, which then permits the leaf spring to move out of the path of movement of the cam. When the electrical power no longer is supplied to the electrical gauge, the bimetallic strip forces the spring into contact with the cam which, in turn, returns the gauge indicator to a desired reference position. The resistance wire may be made an operative element in the electrical gauge circuitry used to provide gauge indications.

3 Claims, 7 Drawing Figures

PATENTED DEC 17 1974   3,855,532
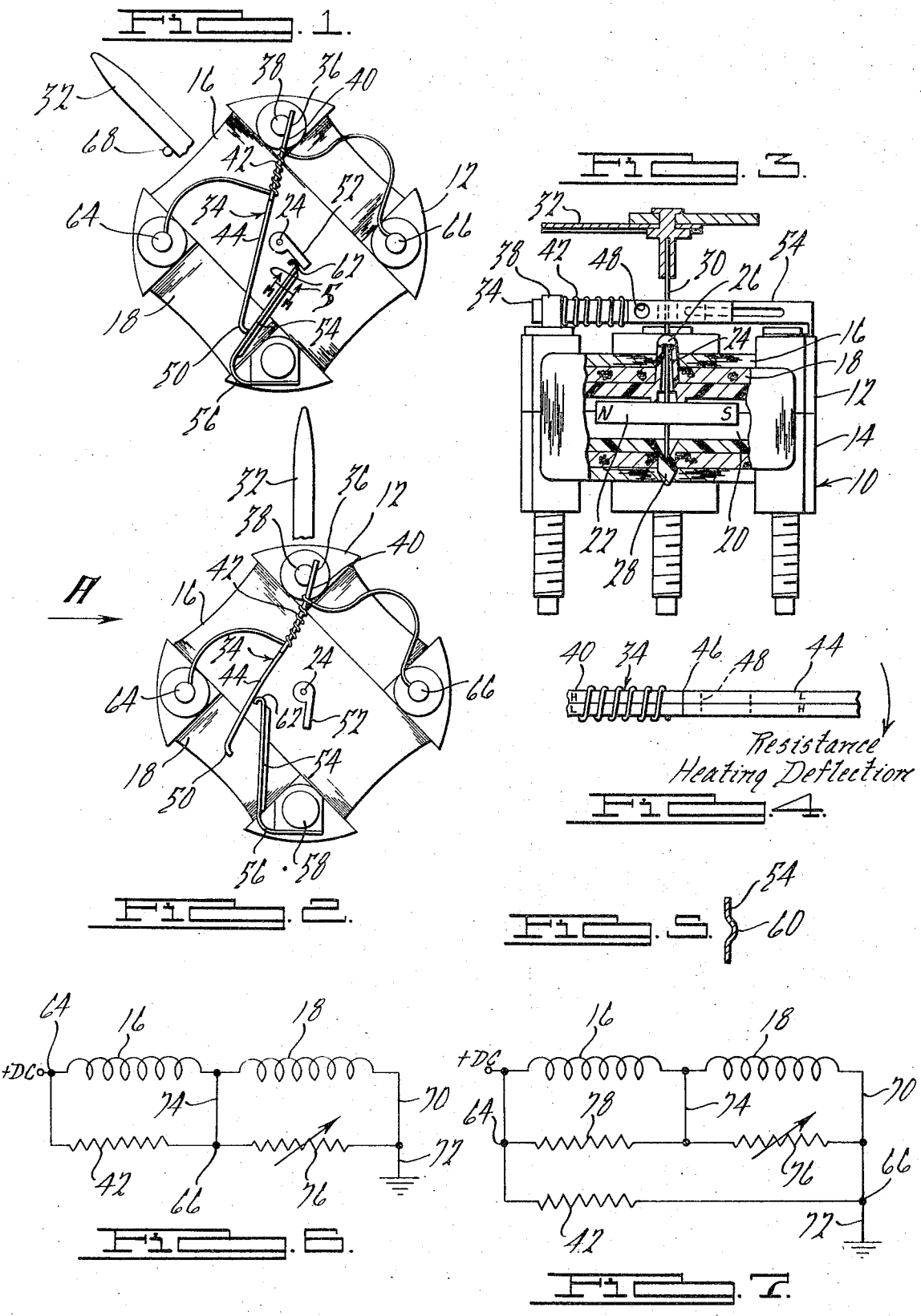

ELECTRICAL GAUGE INDICATOR RETURN DEVICE

BACKGROUND OF THE INVENTION

This invention relates to electrical gauges which do not produce a torque tending to restore their indicating mechanism to a zero or reference level when the guage is disconnected from its source of electrical excitation. More particularly, the invention pertains to an indicator return device used to produce a torque when an electrical gauge is not in use to return its indicator mechanism to a zero or reference level.

The indicator return device of the invention is particularly suitable for use with magnetic gauges of the type which use a rotating permanent magnet positioned in the field of two or more electrical coils. When electrical power is supplied to the gauge coils, the permanent magnet rotates such that its poles align themselves with the vector resultant of the fields produced by the currents in the gauge coils. Gauges of this type typically do not return to a zero or reference position upon removal of the source of electrical power supplying current to the gauge coils. In most cases, it is desired to have the gauge indicator return to a reference level under such condition, but to accomplish this with the use of springs or the like attached to the frame of the gauge and to the indicator mechanism introduces a torque into the gauge which produces a non-linear calibration curve or gauge response when the device is being used for its intended purpose.

Electrical gauges of the kind described above frequently are used in motor vehicles to indicate fuel level, engine coolant temperature, and engine oil pressure. Where the electrical gauge is used to indicate engine coolant temperature or oil pressure, the interruption of the electrical power supplied to the gauge, for example, by shutting off the vehicle's engine, should result in the gauges' return to a zero or reference level because engine coolant temperature and oil pressure decrease under such condition. However, were the electrical gauge to be used to indicate fuel level, it may be desirable to have the gauge retain its reading even if the electrical power to the gauge is removed. In the latter case, a gauge indicator return device is not particularly desirable, but in the former case, it is.

SUMMARY OF THE INVENTION

It is an object of the present invention to provide an indicator return device for an electrical gauge which may be easily added at minimum cost to a guage for which it is desired to have a return of the indicator to a zero or reference level upon the cessation of supply of electrical power to the gauge.

It is another object of the invention to provide an indicator return device which does not interfere or affect the gauge calibration or response when electrical power is supplied to the gauge.

A still further object is to provide an indicator return device for an electrical gauge that is simple in design, inexpensive, and at least a portion of which may be used as a circuit element in the circuitry required for gauge operation.

An electrical gauge indicator return device which satisfies these objects comprises a bimetallic strip having a coil of resistance wire wound around a portion of it and a leaf spring mounted on the gauge frame and positioned to engage or be engaged by the bimetallic strip. A cam is attached to a shaft on which the indicator of electrical gauge rotates. When electrical power is supplied to the electrical gauge, the bimetallic strip deflects such that the leaf spring is removed from the path of movement of the cam, but, when there no longer is a supply of electrical power to the gauge, the leaf spring moves under the influence of the bimetallic strip to engage the cam and rotate the indicator mounted on the gauge shaft to a desired zero or reference position.

The invention may be better understood by reference to the detailed description which follows and to the drawings.

BRIEF DESCRIPTION OF THE DRAWINGS

FIG. 1 is an elevational view of a magnetic gauge movement having an indicator return device constructed in accordance with the invention;

FIG. 2 is an elevational view of the magnetic gauge of FIG. 1, but has the indicator return device shown in a position which it occupies when electrical power is supplied to the magnetic gauge;

FIG. 3 is a rotated side view, looking in the direction of the arrow A in FIG. 2, of the magnetic gauge of FIGS. 1 and 2 with a portion of the gauge shown in section;

FIG. 4 is a partial sectional view of the bimetallic strip utilized in the indicator return device;

FIG. 5 is a sectional view of one portion of the leaf spring utilized in the indicator return device; and FIGS. 6 and 7 are alternate schematic diagrams of circuits in which the magnetic gauge of FIGS. 1 to 5 may be connected.

DETAILED DESCRIPTION OF THE INVENTION

With reference to the drawings, wherein like numerals refer to like parts in the several views, there is shown an electrical magnetic gauge 10. The gauge 10 has a frame formed from mating parts 12 and 14 which, preferably, are made from a plastic or other nonmagnetic material. Two electrical coils 16 and 18 are wound on the exterior of the frame formed by the mating parts 12 and 14. The axes of the coils 16 and 18 are perpendicular to one another.

The frame formed by the parts 12 and 14 has a chamber 20 formed within it. A disc-shaped permanent magnet 22 has a north pole N and a south pole S. The permanent magnet 22 is mounted for rotation on a shaft 24, which rotates in a first bearing 26 formed in the part 12 of the frame and in a second bearing 28 formed in the part 14 of the frame. The shaft 24 has a reduced-diameter portion 30 which extends to the exterior of the frame and on which is mounted a gauge indicator 32 which rotates with the shaft 24. A cam 52 is firmly affixed to the shaft 24 such that rotation of the cam 52 about the shaft causes rotation of the shaft and rotation of the indicator 32 attached to the shaft 24.

When electrical current flows through the gauge coils 16 and 18, the poles of the permanent magnet 22 align themselves with the vector resultant of the magnetic fields produced by the currents in the gauge coils 16 and 18. By variation of the current levels in the respective gauge coils, the position of the indicator 32 may be varied. In the absence of an indicator return device, the indicator 32, the movement of which usually is damped by a viscous fluid in the chamber 20, retains the reading it has obtained as a result of the currents in the coils 16 and 18 after the supply of such currents has ceased.

The indicator return device of the invention provides a means for producing a torque, after such currents have ceased to flow through the gauge coils 16 and 18, to return the indicator 32 to a zero or reference position such as the position indicated in FIG. 1 of the drawings.

The indicator return device comprises a bimetallic strip 34 having one of its ends 36 welded or otherwise affixed to an electrical connecting post 38 attached to the gauge frame. Preferably, the bimetallic strip 34 has a first portion 40 about which a coil of resistance wire 42 is wound and a second portion 44. The bimetallic strip 34 has its first portion 40 formed from two different metal compositions, one of which has a higher coefficient of expansion than the other. The second portion 44 of the bimetallic strip 34 is similarly constructed but has the metal layers reversed with respect to those of the first portion 40, as may best be seen in FIG. 4 where the metal layers of high coefficient of expansion are designated by the letter H and where those of lower coefficient are designated by the letter L. The first and second portions 40 and 44 are joined at a point 46 and an opening 48 extends through the second portion 44 to limit the thermal conductivity between the first and second portions. Bimetallic strips of the kind depicted in FIG. 4 are commercially available. The reversed metal layers in the bimetallic strip 34 provide ambient temperature compensation such that its unattached end 50 remains substantially in the same position as a result of changes in ambient temperature. However, upon the application of heat through the dissipation of electrical energy in the resistance wire coil 42 when a current flows therethrough causes the unattached end 50 of the bimetallic strip to be deflected in one direction as indicated in FIGS. 2 and 4. Instead of being formed from reversed metal layers, the bimetallic strip 34 can be formed from a U-shaped bimetallic strip to provide compensation for ambient temperature variations.

A leaf spring 54 is attached at its curved end 56 to a post 58 on the gauge frame portion 12. The unattached end 62 of the leaf spring 54 extends toward the general direction of the shaft 24 and is perpendicular to it as is the bimetallic strip 34. The leaf spring 54 preferably has a reinforcing rib 60 formed in it, as may best be seen in FIG. 5. The leaf spring 54 and the bimetallic strip 34 are in alignment with the cam 52. The cam 52 has a protuberance extending radially from the shaft 24 and, in FIG. 1, the end 62 of the leaf spring 52 is in contact with this cam protuberance.

The coil or resistance wire 42 wound around the first portion of the bimetallic strip 34 is attached to electrical terminals 64 and 66. When current flows through the coil of resistance wire 42, as when the electrical gauge is in use, the bimetallic strip is heated and bends as shown in FIG. 2 such that the end 62 of the leaf spring 54, which is arranged such that it urges or biases the bimetallic strip 34 toward the left as viewed in FIGS. 1 and 2, is in contact with the central region, that is, the region intermediate the ends, of the bimetallic strip 34 and thus is out of the path of movement of the cam 52. With this condition, the permanent magnet 22 and shaft 24 are free to rotate in response to current in the electrical coils 16 and 18. When current ceases to flow through the coil of resistance wire 42, the bimetallic strip 34 assumes the position shown in FIG. 1 where it may be seen that the end 50 of the bimetallic strip is in contact with the central region, that is, the region intermediate the ends, of the leaf spring 54 and that the end 62 of the leaf spring contacts the cam 52 causing it to be rotated to the position shown FIG. 1. The travel of the indicator 32 may be limited by a stop 68 which may be mounted or attached to the gauge indicator face (not shown).

With reference now to FIG. 6, there is shown an electrical circuit for the gauge described in FIGS. 1 through 5. In the circuit of FIG. 6, the coils 16 and 18 are connected in series across a DC source of electrical energy (not shown) when the gauge is in use. The terminal 70 of the coil 18 is connected to ground at 72. The coil of resistance wire 42, which heats the first portion 40 of the bimetallic strip 34, is connected in parallel with the gauge coil 16. Thus, terminal 64 of the resistance wire 42 is connected to the DC source and its other terminal 66 is connected by a lead 74 to the junction formed between the coils 16 and 18. A variable resistor 76 is connected between the terminal 66 and ground 72. Preferably, each of the electrical coils 16 and 18 has a resistance of about 90 ohms as does the coil of resistance wire 42. The resistor 76 may be variable between zero and 90 ohms.

In the operation of the circuit of FIG. 6, when electrical power is supplied to the circuit, current flows through the coils 16 and 18 and through the resistance wire 42 and the variable resistor 76. The current through the resistance wire 42 heats the bimetallic strip 34 and bends it as indicated in FIG. 4, thus, permitting the indicator 32 to rotate to a position determined by the vector resultant of the magnetic fields produced by the coils 16 and 18. Variation of the electrical resistance 76 in accordance with some parameter to be measured, such as the temperature of the coolant used in a vehicle engine, changes the amount of current flowing through the magnetic gauge coils 16 and 18 to produce a variation in the position of the indicator 32. When the power to the circuit of FIG. 6 is removed, current no longer flows through the resistance wire 42. The bimetallic strip portion 40 gradually cools and acts upon the leaf spring 54 forcing its end 62 into contact with the protuberance of the cam 52 to return the indicator 32 to its zero or reference position.

The circuit shown in FIG. 7 is similar to that of FIG. 6 except that the coil of resistance wire 42 heating the first portion 40 of the bimetallic strip 34 preferably has a resistance of about 300 ohms and is connected directly between the positive terminal of the DC source of electrical energy and ground 72. A resistor 78, preferably about 90 ohms, is connected between the terminal 64 and the lead 74 connected to the midpoint of the coils 16 and 18. In this circuit of FIG. 7, variation of the resistance 76 changes the current through the resistor 78 and magnetic gauge coils 16 and 18 in accordance with a parameter to be measured, but variations of the resistance 76 does not affect the current through the coil of resistance wire 42.

In the circuit of FIG. 6, the wire 42 is a part of the functioning circuit for the magnetic gauge, that is, variation of the resistance 76 produces a variation in the current through not only the coils 16 and 18 of the magnetic gauge but also through the coil of resistance wire 42. The resistance 42 in this circuit is used to produce the desired response of the indicator 32 as a result of variations in the resistance 76, as is conventional in magnetic gauge circuits of this type, but the resistance 42 has the additional function of providing the heat energy necessary to increase the temperature of the bimetallic strip 34 to deflect it to permit the indicator 32 to be rotated. Thus, the electrical energy dissipated by the resistance 42, which energy ordinarily would be put to no beneficial use, is used to considerable advantage in the device of the invention illustrated in FIGS. 1 through 5.

What is claimed is:

1. An indicator return device for an electrical gauge having a frame and an indicator attached to a shaft pivotally mounted in said frame, said indicator return device being designed to move said indicator to a predetermined position upon the cessation of the supply of electrical power to said gauge and comprising: a cam attached to said gauge shaft, a bimetallic strip attached to said frame and extending therefrom, a leaf spring attached to said frame and extending therefrom, said leaf spring and bimetallic strip being in contact with one another and said leaf spring urging said bimetallic strip in a direction away from said shaft and cam mounted thereon, said bimetallic strip having a first position when said gauge is not connected to a source of electrical energy wherein one end of said bimetallic strip is in contact with said leaf spring at a point thereon located intermediate the ends of said leaf spring and said bimetallic strip having a second position when said gauge is connected to a source of electrical energy wherein one end of said leaf spring is in contact with said bimetallic strip at a point thereon located intermediate the ends of said bimetallic strip.

2. An indicator return device for an electrical gauge having an indicator mounted in a frame for rotation with a shaft rotatable in said frame, said indicator return device comprising a cam mounted on said shaft for rotation therewith, said cam having a protuberance radially extending from said shaft, a bimetallic strip attached at one of its ends to said frame; means for heating said bimetallic strip only when electrical power is supplied to said gauge, heating of said bimetallic strip causing it to bend; and a leaf spring attached at one of its ends to said frame and having its other end movable, said leaf spring urging itself into contact with said bimetallic strip and urging itself radially away from said shaft, said bimetallic strip when not being heated by said heating means causing said leaf spring to have its movable end make contact with said protuberance of said cam, and said bimetallic strip when heated by said heating means bending to permit said movable end of said leaf spring to move out of the path of movement of said protuberance of said cam.

3. In an electrical gauge of the type which comprises a frame and an indicator attached to a shaft pivotally mounted to said frame, the improvement which comprises: an indicator return device for moving said indicator to a predetermined reference position upon the cessation of the supply of electrical power to said gauge, said indicator return device including a cam attached to said shaft, a bimetallic strip attached to said frame and extending in a direction perpendicular to said shaft, a leaf spring attached to said frame and extending in a direction perpendicular to said shaft, said leaf spring being in alignment with said cam with respect to the location of said cam on said shaft, a coil of resistance wire wound on said bimetallic strip, said bimetallic strip being in contact with said leaf spring and said leaf spring urging said bimetallic strip in a direction away from said shaft, said bimetallic strip having its unattached end in contact with the central region of said leaf spring when said bimetallic strip is at ambient temperature, said leaf spring having its unattached end in contact with the central region of said bimetallic strip when a portion of said bimetallic strip is at a predetermined temperature in excess of said ambient temperature, said portion of said bimetallic strip being heated to said predetermined temperature when electrical current is supplied to said electrical gauge and to said coil of resistance wire connected in circuit with said electrical gauge, whereby, upon the cessation of the supply of electrical power to said gauge, said leaf spring is forced by said bimetallic strip into contact with said cam to cause said shaft and indicator of said gauge to move to said predetermined reference position.

* * * * *